United States Patent [19]

Nakasaki et al.

[11] Patent Number: 4,869,336

[45] Date of Patent: Sep. 26, 1989

[54] SNOWMOBILE

[75] Inventors: Eiji Nakasaki, Kakogawa; Katsunori Tajima, Amagasaki; Yasuo Igarashi, Kawanishi; Hiroto Sakakibara, Kobe, all of Japan

[73] Assignee: Sumitomo Rubber Industries, Ltd., Hyogo, Japan

[21] Appl. No.: 158,911

[22] Filed: Feb. 22, 1988

[30] Foreign Application Priority Data

Nov. 25, 1987 [JP] Japan ................... 62-298340

[51] Int. Cl.⁴ .......................................... B62M 27/02
[52] U.S. Cl. .................... 180/196; 280/7.12; 280/28; 280/21.1
[58] Field of Search ............... 180/183, 196; 280/7.12, 280/7.14, 21 R, 28

[56] References Cited

U.S. PATENT DOCUMENTS

| 566,438 | 8/1896 | Anderson et al. | 280/7.14 |
|---|---|---|---|
| 3,632,126 | 1/1972 | Shorrock | 280/28 |
| 3,711,109 | 1/1973 | Hofbauer | 280/28 |
| 3,893,527 | 7/1975 | Walker et al. | 180/183 |
| 4,577,876 | 3/1986 | Harris | 280/7.12 |

Primary Examiner—John A. Pekar
Attorney, Agent, or Firm—Birch, Stewart, Kolasch & Birch

[57] ABSTRACT

A snowmobile including a body a pair of rear wheels with tires a motor for driving the rear wheel, an axis connected to a handle originally for a front wheel, and skid member mounted on the axis. The skid member comprises a skid, extending in the longitudinal direction of the body, bent upward in its front part, support members protuberantly provided on the upper surface of the skid, and rotatably connected to the axis and at least one fin, protuberantly provided on the under surface of the skid, extending front to rear from a position beneath the above mentioned support member, located at the substantial center in its longitudinal direction of the skid, and the length of the fin is set in a range of 40 to 60% of the length of the skid.

6 Claims, 8 Drawing Sheets

SNOWMOBILE

BACKGROUND OF THE INVENTION

1. Field of the Invention

The present invention relates to a snowmobile having a skid and a pair of driving wheels.

2. Prior Art

To run on rough roads such as sandy, muddy, bump, or rocky roads, there has been favorably used a three wheeler so called three wheeled buggy that runs comparatively slow. And to run on a snow surface with such three wheelers, detachable skids fixed thereto have been proposed.

Hitherto, such skids have been fixed on the tire of the front wheel or on the front fork for sustaining the front wheel.

As for the skids fixed on the front fork, its under surface can not comply with the inclined snow surface. As a result, grip and maneuverability are decreased. Further, the skid sometimes strikes the ground under the snow, and the rider is placed in danger.

On the other hand, as for the skids fixed on the tire of the front wheel, the under surface can comply with the inclined snow surface, but the relative portion between the front wheel and the skid is liable vary, and running stability becomes bad.

SUMMARY OF THE INVENTION

It is therefore, an object of the present invention to provide a snowmobile improved in capability to run safely on the snow wherein the skid can incline according to the inclination of snow surface without any change in the relative position between the skid and the body by mounting skid members rotatably on the front wheel axis of an all terrain three wheeler and providing a fin on the under surface of the skid.

According to one aspect of the present invention, the snowmobile comprises a body, a pair of rear wheels with tires, provided on the rear portion of the body, a motor for driving the rear wheels mounted on the body, an axis originally for a front wheel, provided on the front portion of the body and connected to a handle; and skid members mounted on the axis. The skid members comprise a skid, extending in the longitudinal direction of the body, bent upward in the front part, support members, protuberantly provided on the upper surface of the skid and rotatably connected to the axis, and a fin, protuberantly provided on the under surface of the skid, extending from front rear under the position of the support members, located at its longitudinal center, the length of the fin being 40 to 60% of the length of the skid.

Preferably, the skid members comprise one fin extending along the center line of the skid or two fins each extending along each edge of the skid.

BRIEF DESCRIPTION OF THE DRAWINGS

The invention is further described by way of the following illustrations wherein.

DETAILED DESCRIPTION OF THE INVENTION

An embodiment of the present invention will now be described, by way of example only, referring to the drawings.

Figure 1:
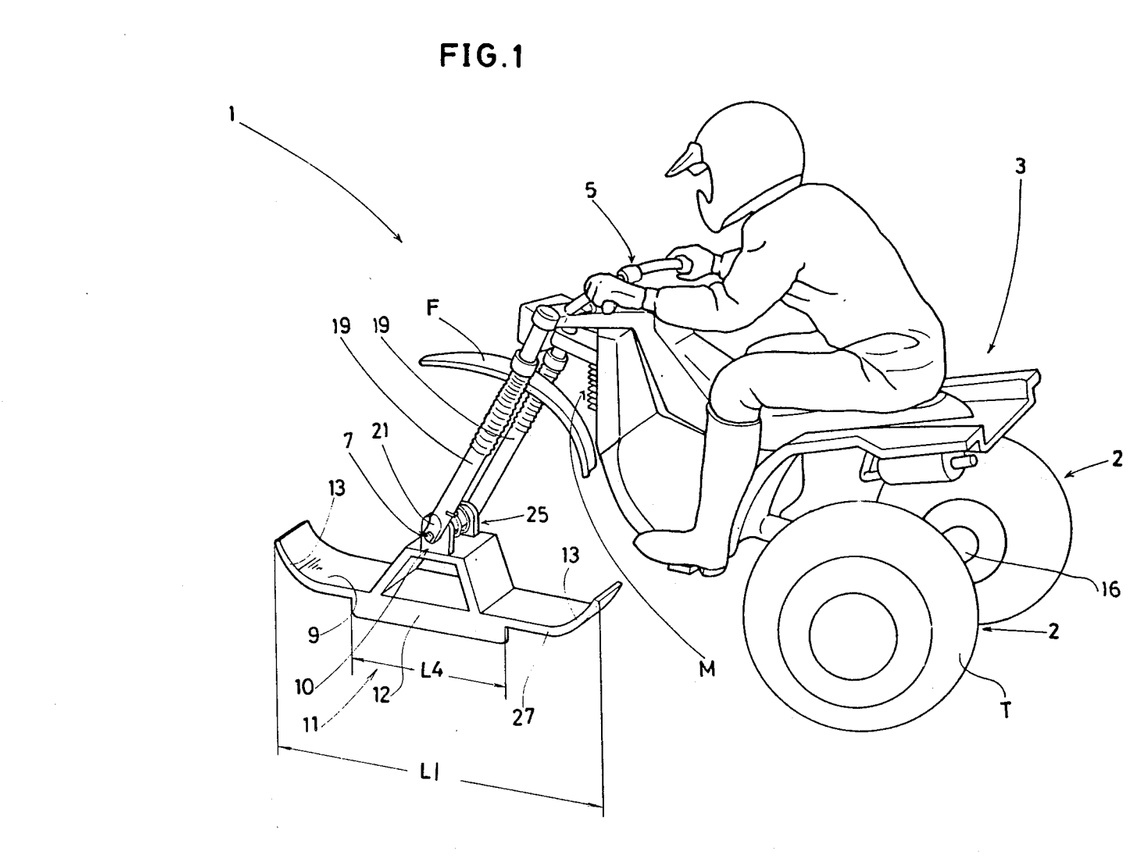
FIG. 1 is a perspective view showing an embodiment of the present invention.

In FIG. 1, the snowmobile 1 is based on a conventional buggy type All Terrain three wheeler, and is characterized in that skid member 11 is rotatably mounted on the front wheel axis 7, instead of a front wheel.

The body 3 is provided on its middle portion with a motor M, such as gasoline engine, and also provided on its rear portion with a rear wheel axis 16 connected to the motor M through a transmission mechanism of well-known construction.

The rear wheels 2, 2 are attached to both ends of the rear wheel axis 16, respectively. A block pattern tire T for the All Terrain Vehicle, with blocks on the tread surface, is mounted on each rear wheel 2.

Further, the body 3 is provided on its front portion with a a front fork 19.

The front fork 19 is composed of a pair of pipes with a built-in suspension mechanism of well-known construction, and provided on its upper end with a handle 5. On the other hand, the lower end of each pipe is pressed to form a flattened part 21, and holes 20 (FIG. 2) are made therein, and the above mentioned wheel axis 7 passes goes through the holes 20 fastened by the hexagon head bolt, to support rotatably the skid member 11.

Figure 2:
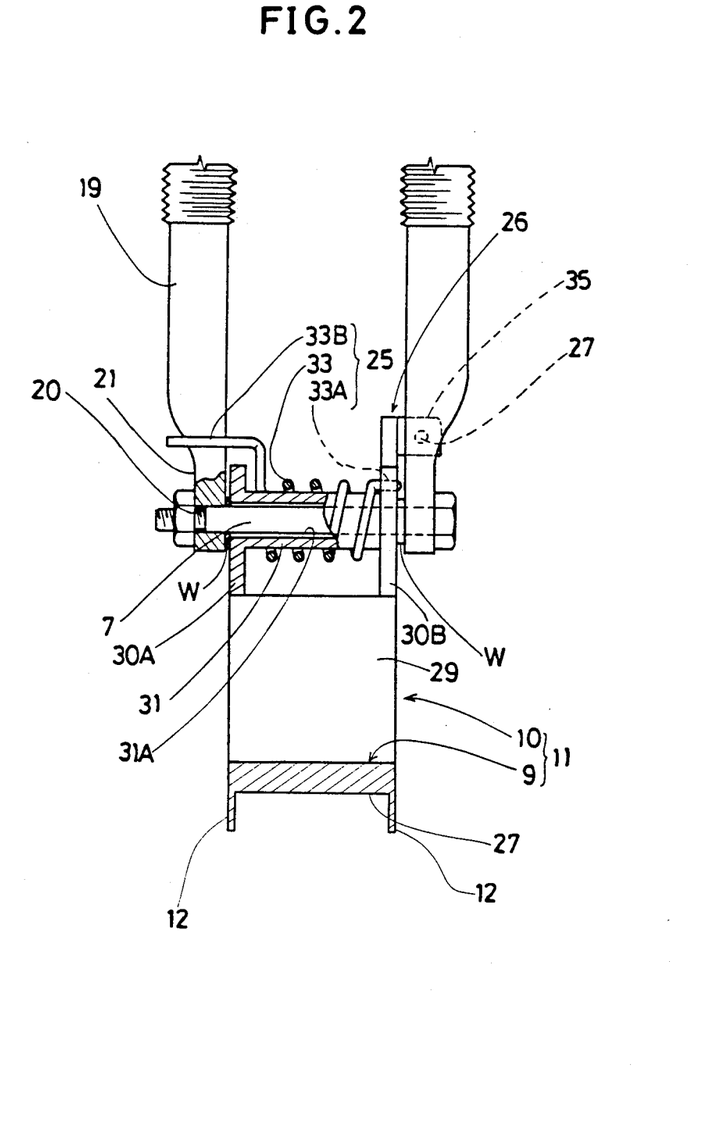
FIG. 2 is a front sectional view showing the skid members of FIG. 1 thereof.
Figure 3:
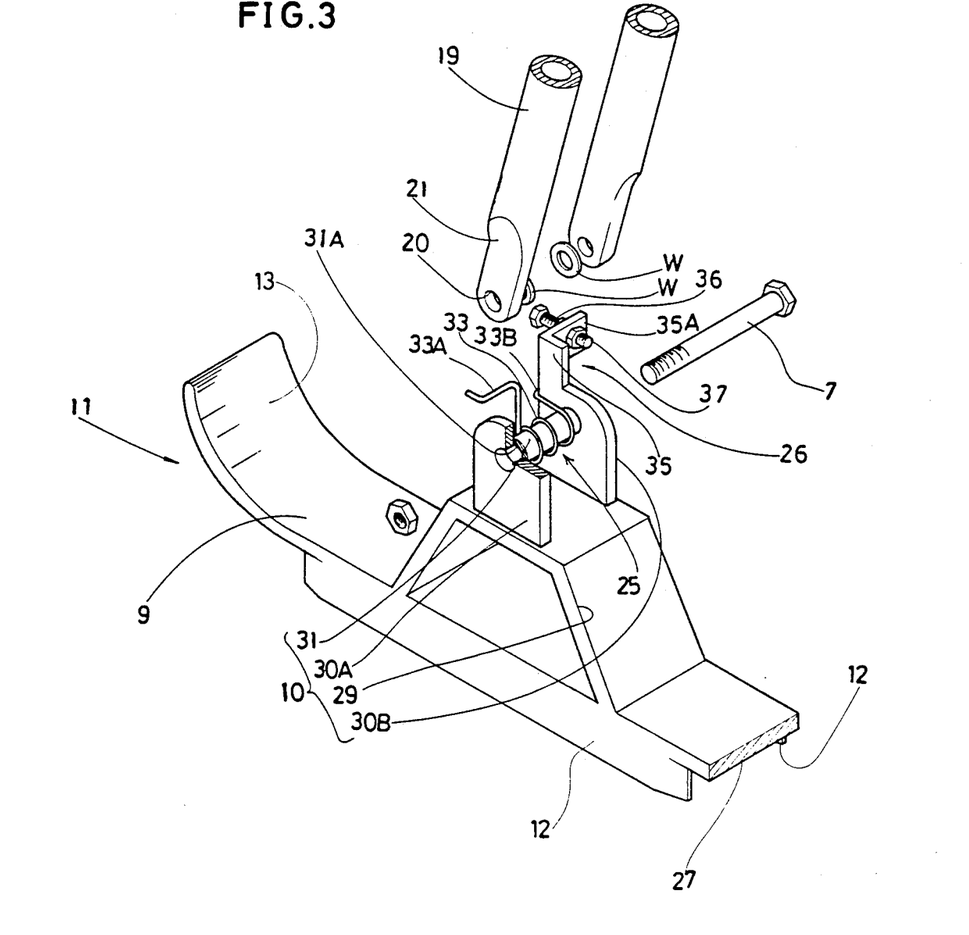
FIG. 3 is an exploded view showing the skid members of FIG. 1.

In FIGS. 2 and 3, the skid member 11 comprises a skid 9, support member 10, a pair of fins 12, and further in this embodiment, a spring means 25 for biasing the front end of the skid 9 upward and a stopper 26 for limiting the inclination of the skid 9 by the spring means 25.

The skid 9 extends in the longitudinal direction of the body 3, and is bent upward in the front part and rear part. There can be used for the skid 9 any material having low friction against snow, for example, synthetic resin, or composite material such as resin coated metal, like aluminum, or fiber reinforced plastic, FRP. Especially, FRP is preferred for its high strength and low friction. In this embodiment, the length L2 (FIG. 4) of the front and rear bent parts 13 is 6% to 12% of the whole length L1 of the skid 9, and the bent height L3 of the bent part 13 is 6 to 12% of the length L1 of the skid 9.

Each fin 12 projects downwardly from the under surface of the skid 9, and in this embodiment, extends along each edge of the skid 9, and the fins 12 and the skid 9 are formed as a onepiece body.

In the longitudinal direction of the body 3, each fin 12 extends from front to rear from beneath the position where the support members 10 are located at its substantial center.

The length L4 of each fin 12 is 40% to 60% of the length L1 of the skid 9. When the length L4 is less than 40%, the stability in straight running becomes worse. On the contrary, when the length L4 is more than 60%, the stability becomes better, but maneuverability in cornering becomes bad. To make the stability in straight running and the maneuverability in cornering compatible with each other, the best range for the length L4 is 40% to 60% of the length L1 of the skid 9.

The support member 10 is protuberantly provided on the upper surface of the skid 9 and, in this example, includes an almost stand-shaped base 29 protruding from the upper surface of the skid 9, a pair of support plates 309A and 30B provided on the top surface of the base 29, facing each other in the widthwise direction of the skid 9, and a support pipe or pin 31 bridging over the support plates 30A and 30B to connect them in one body.

A center hole 31A passes through the support pin 31 and opened at the side faces of the support plates 30A and 30B, and the wheel axis 7 penetrates therethrough. The skid member 11 is attached rotatably by the axis 7 which penetrates though the holes 20 of the front fork 19 and the center hole 31A of the support member 10. The reference W indicates a washer disposed therebetween.

The distance of the center hole 31A form the under surface 27 of the skid 9, which defines the height H1 of the skid member 11, is between the height H2 plus 25 mm and minus 25 mm, wherein the height H2 is a distance between the center of the front wheel and the ground S when the front wheel 8 is attached to the front fork 19 and subjected to a static load.

Accordingly, the skid member 11 is rotatably attached to the axis 7 without throwing the body 3 off balance.

Further, in this embodiment, the skid member 11 includes the spring means 25 and the stopper 26.

The spring means 25 is, in this example, a torsion coil spring 33 slipped on the support pin 31. The spring 33 is provided on its ends with hook portions 33A and 33B, and the hook portion 33A holds the rear of the front fork 19, and contrary the hook portion 33B holds the front of the support plate 30B, whereby the front end of the skid 9 is forced upward.

Figure 4:
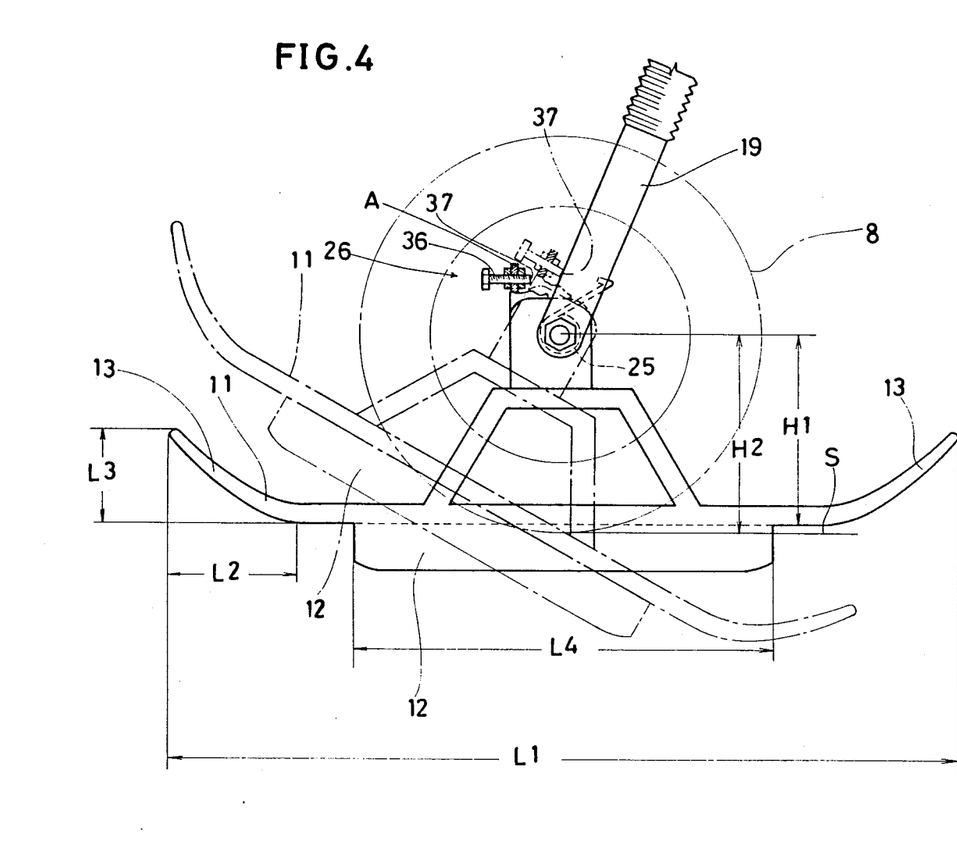
FIG. 4 is a side view of the skid member showing the function of the spring means and stopper.

The stopper 26 is, in this example, a bolt piece 36 fixed on a L-shaped joint part 35 with nuts adjustablly of its backward projection therefrom. The joint part 35 is provided in the front portion of the top of the support plate 30B, and bent at its front so that the bent piece 35A extends outward in the widthwise direction of the skid 9, and the bolt piece 36 pierces it from the front to the rear thereof. As shown in FIG. 4, a confliction of the rear end 37 of the stopper 26 with the front of the front fork 19 limits the upward inclination of the skid 9. The end point of the inclination is adjustable by adjustment of the stopper 26, as mentioned above.

Figure 5:
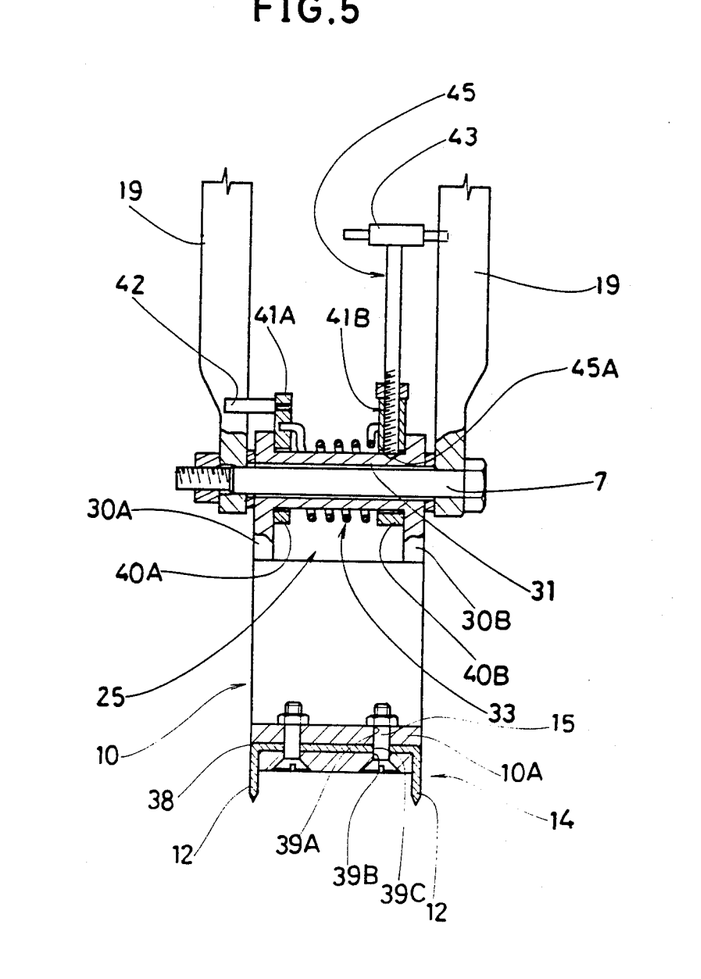
FIG. 5 is front sectional view showing a skid member of another embodiment of the present invention.
Figure 6:
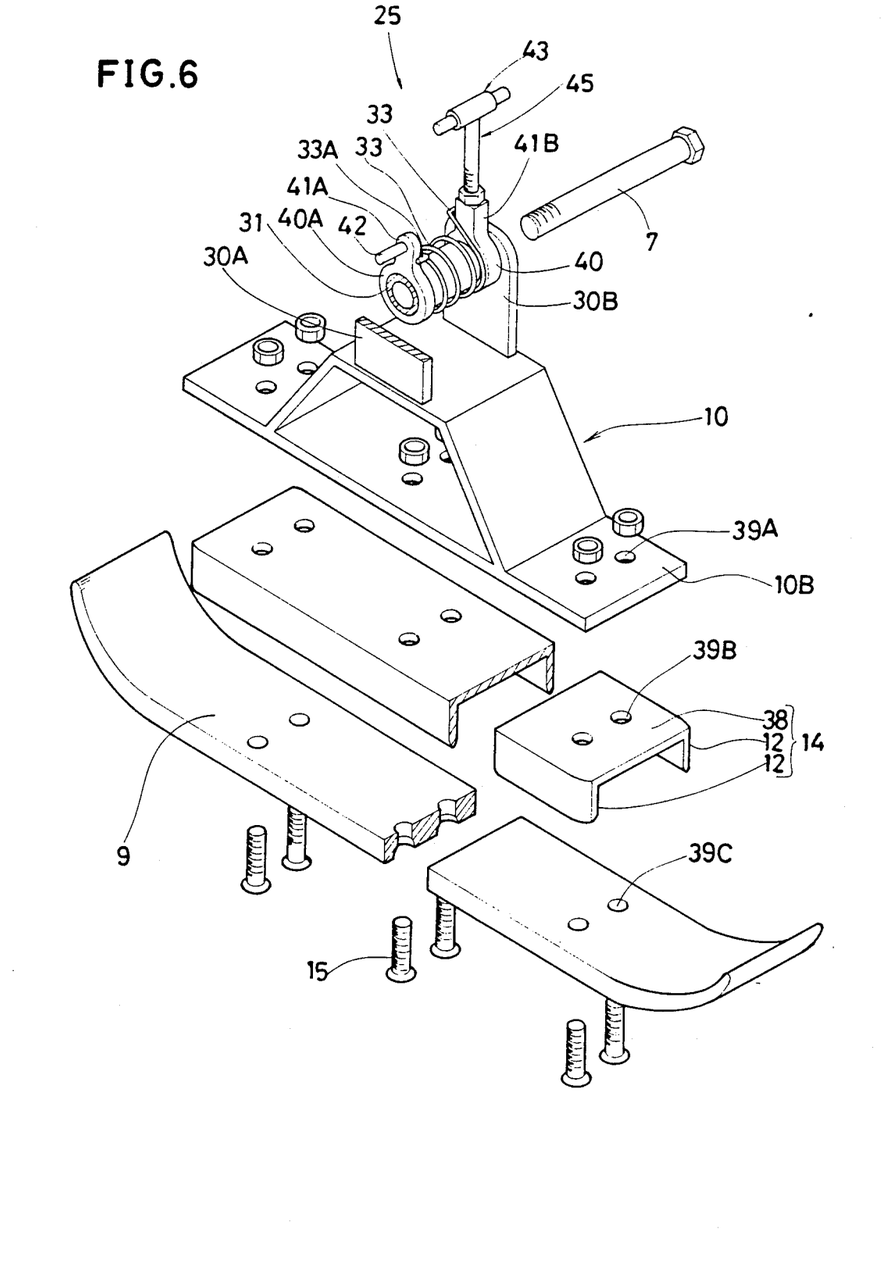
FIG. 6 is an exploded view of a skid member.

FIGS. 5 and 6 show another embodiment of the present invention, wherein the skid member 9 comprises a pair of detachable fins 12, and further show another example of the spring means 25 for use in case the fender F is attached to a comparatively low position of the body 3.

The skid member 11, in this embodiment, comprises the skid 9, the support member 10 and a pair of fins 12, which are formed separately.

The support member 10 comprises a base plate 10B extending along the skid 9.

The fins 12 are connected at their upper edges by a connecting plate 38 disposed between the skid 9 and the base plate 10B, and the fins 12 and the connecting plate 38 form a one-piece channel member 14.

The base plate 10B, the connecting plate 38 and the skid 9 are fixed by bolts 15 passing through the holes 39A, 39B, 39C provided therein, respectively, whereby the fins 12 project downward beyond the under surface of the skid 9 and extend along each side of the skid 9. Obviously the fins 12 can be detached.

Accordingly, by making the fins 12 detachable, it becomes easy to substitute new fins for a damaged one, and further it becomes possible to choose material combinations most suitable for each part under the snow condition, for example, FRP for the skid 9 and stainless steel, having strength and toughness, for the fins 12.

The spring means 25 in this example can adjust its force biasing the skid 9, and comprises the above mentioned torsion coil spring 33 and ring members 40A, 40B slipped loosely on the support pipe or pin 31.

A ring member 40A is disposed between the support plate 30A and the spring 33, and connected to one end of the spring 33 by the hook portion 33A. Further, on the outer side of an expanded part 41A formed on the periphery thereof, a hook pin 42 is provided to contact with the rear of the front fork 19, whereby one end of the spring 33 is caught on the front fork 19 through the hook portion 33A, the ring member 41A and the hook pin 42.

On the contrary, the ring member 40B is disposed between the support plate 30B and the spring 33, and connected to the other end of the spring 33 by the hook portion 33B. A clamp 45 is provided in an expanded part 41B formed on the periphery of the ring member 40B. The clamp 45 has a handle 43 at the upper end and can screw up and free the support pipe 31, whereby the other end of the spring 33 can be fixed to the support pipe 31 at almost any position therearound.

Therefore, by rotating the handle 43 to release the support pipe 31, and turning down the handle 43 to wind up the spring 33, then rotating reversely the handle 43 to screw up the support pipe 31, the force biasing the skid 9, that is, forcing the front end thereof upward is increased.

To make the clamp more secure, the support pipe 31 is preferably provided on its periphery with dents which the inner tip 45A of the clamp 45 gets into.

Figure 7:
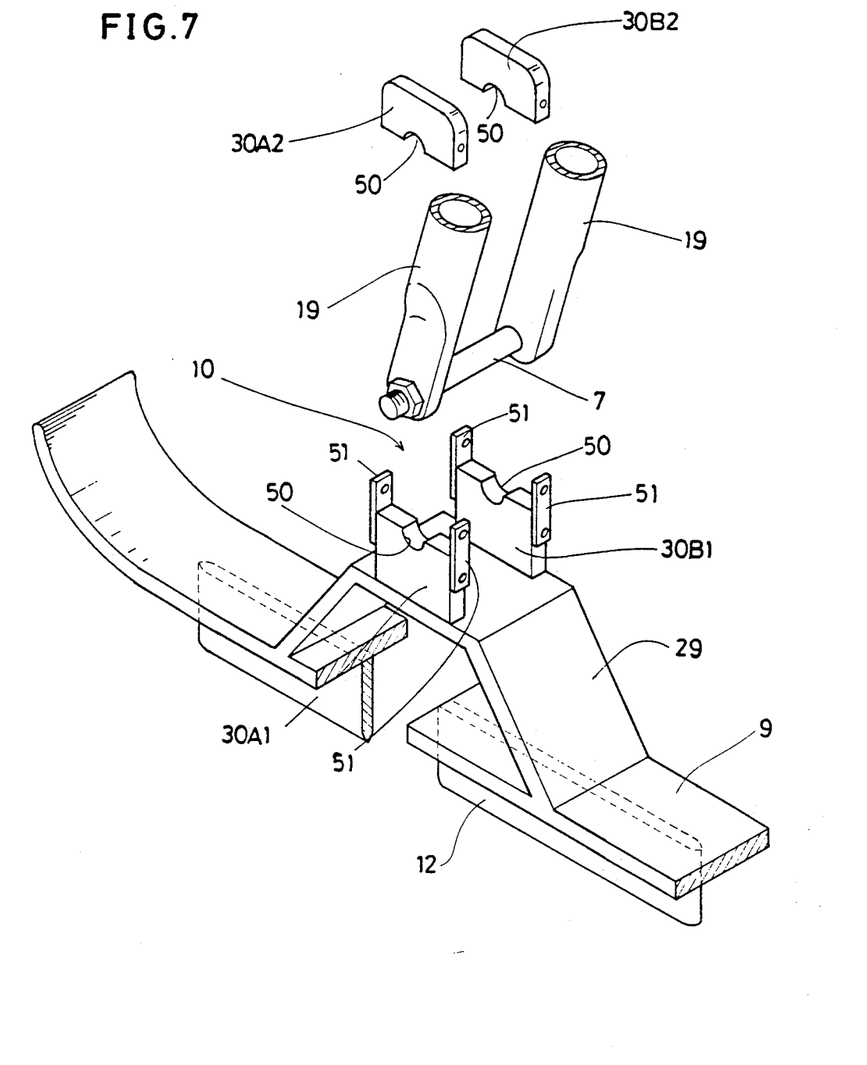
FIG. 7 is an exploded view of a skid member of another embodiment of the present invention.

FIG. 7 shows the skid member 11 of another embodiment of the present invention wherein the skid member 11 include one fin 12 extending along the center line of the skid 9, and the fin 12 and the skid 9 are formed in a one-piece body.

The support member 10 comprises the base 29 and the support plates 30A and 30B thereon, but in this embodiment each support plate is formed in two pieces including a lower piece 30A1, 30B1, fixed to the base 29 and an upper piece 30A2, 30B2 joined thereto by metal fittings 51. In the bottom of the upper piece 30A2, 30B2, and the top of the lower piece 30A1, 30B1, semicircular cuts 50 are provided to form holes 31A into which the axis 7 is inserted, and the metal fittings 51 are fixed on the front and rear of the above mentioned pieces with screws.

Accordingly, in this embodiment, the skid members 11 can be attached and detached without detaching the axis 7 from the front fork 19.

Figure 8:
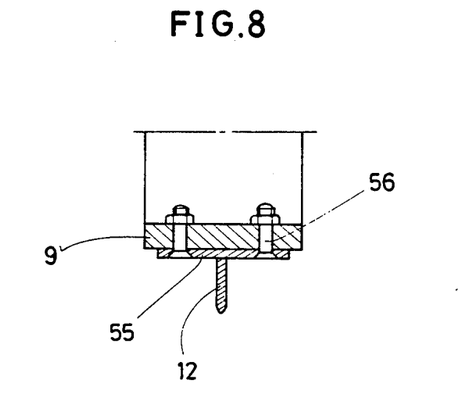
FIG. 8 is a sectional segmentary view showing a fin of another embodiment of the present invention.
Figure 9:
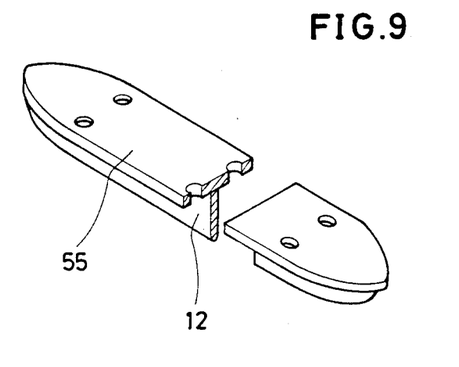
FIG. 9 is a perspective view of the fin of FIG. 8.
Figure 10:
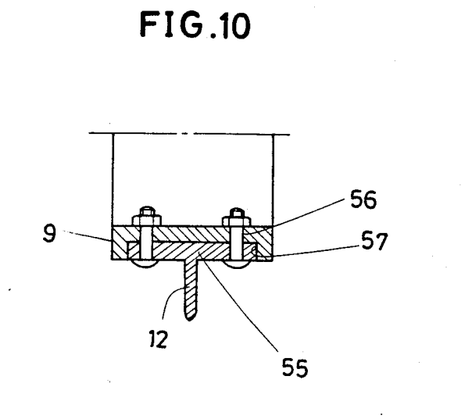
FIG. 10 is a sectional segmentary view showing another way to mount the fin of FIG. 9 on the skid.

FIGS. 8 to 10 show the fin 12 of the skid member 11 a further embodiment of the present invention, wherein the skid member 11 includes a detachable one fin 12 extending along the center line of the skid 9. As shown in FIG. 9, the fin 12 is provided on its upper edge with a mounting plate 55 whose upper surface touches the under surface of the skid 9, and the mounting plate 55 is fixed with fixing pieces 56, such as bolts or the like.

The mounting plate 55 can be fixed on the flat surface of the skid 9 as shown in FIG. 8, or in a groove 57 provided on the under surface of the skid 9, as shown in FIG. 10. In the later case, the drag will be decreased, and positioning of the fin 12 becomes easy.

(WORKING EXAMPLES AND COMPARATIVE TEST)

PREFERRED EMBODIMENTS

Test examples by way of trial and comparison tests for maneuverability were made.

In each example, the skid and the fin/fins were formed into a one-piece body, and in case one fin was provided, that fin extended along the center line of the skid. On the contrary, in case two fins were provided, those fins extended in parallel along the edges of the skid, respectively.

The examples were evaluated as to their maneuverability in straight running and cornering with varying the ratio of the fin length (L4) to the skid length (L1) as shown in table 1, wherein the value indicates a mean value of the evaluations by three drivers in a feeling test method, and the larger the total value, the better the maneuverability, and further the average speed for test was 30 km/h.

TABLE I

| Ex. No. | Fin number | Fin location | L4/L1 (%) | Maneuverability straight | Maneuverability cornering | total |
|---|---|---|---|---|---|---|
| Embodiments of the invention: | | | | | | |
| 1 | 2 | edges | 42 | 130 | 140 | 270 |
| 2 | 2 | edges | 57 | 140 | 130 | 270 |
| 3 | 1 | center | 42 | 140 | 150 | 290 |
| 4 | 1 | center | 57 | 160 | 145 | 305 |
| Control examples: | | | | | | |
| 1 | 0 | — | — | 100 | 100 | 200 |
| 2 | 2 | edges | 65 | 150 | 105 | 255 |
| 3 | 2 | edges | 32 | 110 | 120 | 230 |
| 4 | 1 | center | 32 | 110 | 130 | 240 |

As apparent from Table 1, the embodiments of the present invention were better in maneuverability than the control examples.

As mentioned above, in this invention, the snowmobile is based on the hitherto used three wheeler for all terrain, and the skid members are rotatably mounted on the body by the front wheel axis instead of the front wheel. Accordingly, the skid members are attached without looseness between the skid members and the axis 7, that is, the displacement between the body and the skid members. As the result, a running stability is improved, and the grip is also increased because the under surface of the skid can incline in accordance with the inclination of the snow surface. Besides, thrusting of the front end of skid into the snow can be avoided.

Furthermore, the fin of a certain length projects into the snow. Accordingly, the maneuverability in straight running and that in cornering at high speed are improved at the same time.

In addition, the spring means and the stopper prevent the front end of the skid from thrusting into the snow at the time of landing after jumping as seen in racing, and safety in high speed running is maintained.

We claim:

1. A snowmobile comprising:
   a body;
   a pair of rear wheels with tires, provided on the rear portion of said body;
   a motor for driving said rear wheels, mounted on said body;
   a front wheel axis provided on the front portion of said body, originally for a front wheel, and connected to a handle; and
   skid member mounted on said front axis,
   said skid member including
   a skid, extending in a longitudinal direction of said body, having a front end bent upward in its front part;
   support member, protuberantly provided on the upper surface of said skid, rotatably connected to said front axis;
   at least one fin, protuberantly provided on the under surface of said skid, extending from front to rear from a position beneath said support member, located at said skid's substantial center in said longitudinal direction the length of said fin being from 40 to 60% of the length of said skid; and
   spring means, connected with said front wheel axis and said support member of said skid, for applying an upward force for forcing said front end of said skid upward.

2. A snowmobile as set forth in claim 1, wherein said skid member comprises one fin extending along the center line of said skid.

3. A snowmobile as set forth in claim 1, wherein said skid member comprises two fins each extending along each edge of said skid.

4. A snowmobile as set forth in claim 1, wherein the height H1 of said skid member is between the height H2 plus or minus 25 mm, wherein the height H1 is defined between the center of said axis and the under surface of said skid, and the height H2 is defined as the distance between what would have been the center of a front wheel originally mounted on said axis and the ground when the front wheel is mounted on the axis and subjected to a static load of the snowmobile.

5. A snowmobile as set forth in claim 1, wherein said skid member further includes an adjuster means for adjusting said upward force of said spring means.

6. A snowmobile as set forth in claim 1, wherein said skid member further includes a stopper means for limiting upward inclination of said front end of said skid.

* * * * *